(12) United States Patent
Park et al.

(10) Patent No.: US 10,535,118 B2
(45) Date of Patent: Jan. 14, 2020

(54) DISPLAY APPARATUS, CONTROLLING METHOD THEREOF, AND TERMINAL THEREOF

(71) Applicant: Samsung Display Co., Ltd., Yongin-si (KR)

(72) Inventors: Sung Jae Park, Wonju-si (KR); Mu Gyeom Kim, Hwaseong-si (KR); Dong Won Park, Asan-si (KR); Jae Sung Bae, Suwon-si (KR); Jae-Gwan Jeon, Incheon (KR); Dong Hwa Shin, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 37 days.

(21) Appl. No.: 15/808,554

(22) Filed: Nov. 9, 2017

(65) Prior Publication Data

US 2018/0130174 A1 May 10, 2018

(30) Foreign Application Priority Data

Nov. 10, 2016 (KR) .......................... 10-2016-0149861

(51) Int. Cl.
*G06T 3/00* (2006.01)
*G06T 7/13* (2017.01)
(Continued)

(52) U.S. Cl.
CPC .......... *G06T 3/0056* (2013.01); *G06K 9/4604* (2013.01); *G06K 9/6267* (2013.01);
(Continued)

(58) Field of Classification Search
CPC ......... G06T 3/0056; G06T 7/13; G06T 7/174; G06T 3/00; G09G 3/20; G09G 3/00; G06K 9/6267; G06K 9/4604
See application file for complete search history.

(56) References Cited

U.S. PATENT DOCUMENTS

2009/0309813 A1* 12/2009 Fujita ................ G02F 1/133512
345/55
2010/0257447 A1* 10/2010 Kim .................... G06F 3/04883
715/702
2014/0282726 A1* 9/2014 Park ................... H04N 21/4858
725/37

FOREIGN PATENT DOCUMENTS

JP    2014167800        9/2014
JP    2014167800 A   *  9/2014  ........... G06F 3/0346
(Continued)

OTHER PUBLICATIONS

JP-2014167800-A (Machine Translation on Feb. 11, 2019) (Year: 2014).*

*Primary Examiner* — Michael Le
(74) *Attorney, Agent, or Firm* — Cantor Colburn LLP

(57) ABSTRACT

A display device includes a display unit which includes a plurality of pixels and a display area having a corner of a non-right angular shape and a signal controller which controls the display unit to display an image through the plurality of pixels based on an input image signal, detects a specific pattern in a partial region, of the image, corresponding to a partial area, of the display unit, including the corner of the non-right angular shape, and controls the display unit to display a partial image corresponding to the partial region of the image in the display area without crossing the corner, according to a position of the specific pattern in the partial region.

16 Claims, 15 Drawing Sheets

(51) Int. Cl.
    *G06T 7/174*        (2017.01)
    *G06K 9/46*         (2006.01)
    *G06K 9/62*         (2006.01)
    *G09G 3/00*         (2006.01)
    *G09G 3/20*         (2006.01)

(52) U.S. Cl.
    CPC ................ *G06T 7/13* (2017.01); *G06T 7/174* (2017.01); *G09G 3/00* (2013.01); *G09G 3/20* (2013.01); *G06K 2209/03* (2013.01); *G06K 2209/27* (2013.01); *G09G 2340/0464* (2013.01); *G09G 2340/145* (2013.01)

(56) References Cited

FOREIGN PATENT DOCUMENTS

| | | |
|---|---|---|
| KR | 1020110066333 | 6/2011 |
| KR | 1020140113165 | 9/2014 |
| KR | 1020140137235 | 12/2014 |
| KR | 1020150025774 | 3/2015 |

\* cited by examiner

DISPLAY APPARATUS, CONTROLLING METHOD THEREOF, AND TERMINAL THEREOF

This application claims priority to Korean Patent Application No. 10-2016-0149861, filed on Nov. 10, 2016, and all the benefits accruing therefrom under 35 U.S.C. § 119, the content of which in its entirety is herein incorporated by reference.

BACKGROUND (a) Field

Exemplary embodiments of the invention relate to a display device, a controlling method thereof, and a terminal thereof.

(b) Description of the Related Art

Demand for a display device having a quasi-quadrangular display area has increased. The display device having the quasi-quadrangular display area having a predetermined shape may be used for a display unit of a wearable device (e.g., a smartwatch, a smart glass, and a head mounted display ("HMD")), a display unit of a cluster of a vehicle, a digital TV, etc.

An overall shape of the quasi-quadrangular display area is quadrangular, however a corner of the display area has a rounded shape or a shape of connections of linear edges that an inner angle of two adjacent edges exceeds 90 degrees.

SUMMARY

The image displayed on the display area of a general quadrangular shape may also be on the display area of the quasi-quadrangular shape.

Exemplary embodiments are directed to a display device displaying an image suitable for the display area of the quasi-quadrangular shape, a controlling method thereof, and a terminal thereof.

A display device according to an exemplary embodiment includes a display unit which includes a plurality of pixels and a display area having a corner of a non-right angular shape, and a signal controller which controls the display unit to display an image through the plurality of pixels based on an input image signal, detects a first specific pattern in a partial region, of the image, corresponding to a partial area, of the display unit, including the corner of the non-right angular shape, and controls the display unit to display a partial image corresponding to the partial region of the image in the display area without crossing the corner according to a position of the first specific pattern in the partial region.

In an exemplary embodiment, the display unit may further include a substrate including a corner of a non-right angular shape, and a light blocking member positioned at a boundary of the display area and which overlaps at least one subpixel among subpixels included in a pixel, of the plurality of pixels, positioned at the corner of the non-right angular shape of the display area.

In an exemplary embodiment, the signal controller may execute edge detection for the image signal, and detects the first specific pattern using the edge-detected image signal.

In an exemplary embodiment, the signal controller may search the first specific pattern only in the partial region of the image.

In an exemplary embodiment, if a first pattern moves a predetermined distance measured by a pixel unit between two continuous frames of the image signal, the signal controller may detect the first pattern as the first specific pattern.

In an exemplary embodiment, the signal controller may classify a region, of the image, corresponding to the partial area including the corner of the non-right angular shape as a first region and another region, of the image, around the first region as a second region to determine the position of the first specific pattern.

In an exemplary embodiment, the signal controller may controls the display unit to display the partial image corresponding to the partial region of the image in the display area if the first specific pattern is detected in the second region of a first frame of the image signal and the first specific pattern is detected in the first region of a second frame following the first frame.

In an exemplary embodiment, the signal controller may control the display unit to stop the display of the partial image if the first specific pattern is detected in the first region of a third frame of the image signal and the first specific pattern is detected outside the first region of a fourth frame following the third frame.

In an exemplary embodiment, the signal controller may control the display unit to stop the display of the partial image if the first specific pattern is detected in the first region during a predetermined time after the partial image is displayed.

In an exemplary embodiment, the signal controller may reduce the partial region of the image in a predetermined ratio to make the partial image.

In an exemplary embodiment, the signal controller may control the display unit to display a second specific pattern, in the partial image, corresponding to the first specific pattern of the partial region at a position corresponding to a position of the first specific pattern in the partial region.

A terminal according to an exemplary embodiment includes a display unit which includes a plurality of pixels, a user input unit which receives an input of a user indicating one region of the display unit; a terminal controller which generates an image signal displaying an indicator corresponding to the user input, and a signal controller which controls the display unit to display an image through the plurality of pixels based on the generated image signal, detects a pattern corresponding to the indicator in the image, and moves a partial image corresponding to a partial region of the image corresponding to the one region based on a position of the pattern in the one region.

In an exemplary embodiment, the display unit may further include a substrate which includes a corner of a non-right angular shape, where the plurality of pixels is disposed on the substrate, and a light blocking member which overlaps at least one subpixel among subpixels included in a pixel, of the plurality of pixels, positioned at the corner of the non-right angular shape.

In an exemplary embodiment, the one region may include the pixel positioned at the corner of the non-right angular shape.

In an exemplary embodiment, a shape of the indicator varies depending on an executed application program.

A controlling method of a display device displaying an image on a display unit including a plurality of pixels and a display area having a corner of a non-right angular shape according to an exemplary embodiment includes receiving an image signal, executing edge detection for the image signal, detecting a specific pattern in a partial region, of the image, corresponding to a partial area, of the display unit, including the corner of the non-right angular shape based on the edge-detected image signal, and displaying a partial image corresponding to the partial region of the image in the display area without crossing the corner based on a position of the specific pattern in the partial region.

In an exemplary embodiment, detecting the specific pattern in the partial region may include searching the specific pattern only in the partial region of the image.

In an exemplary embodiment, displaying the partial image in the display area may include classifying a region, of the image, corresponding to the partial area including the corner of the non-right angular shape as a first region and another region, of the image, around the first region as a second region, and displaying the partial image corresponding to the partial region of the image in the display area if the specific pattern is detected in the second region of a first frame of the image signal and the specific pattern is detected in the first region of a second frame following the first frame.

In an exemplary embodiment, the method may further include stopping the display of the partial image if the specific pattern is detected in the first region of a third frame of the image signal and the specific pattern is detected outside the first region of a fourth frame following the third frame.

In an exemplary embodiment, the method may further include stopping the display of the partial image if the specific pattern is detected in the first region during a predetermined time after the partial image is displayed.

According to exemplary embodiments, an appearance design of the display device and the terminal may be improved.

According to exemplary embodiments, information required by a user may be appropriately displayed in the display area of the quasi-quadrangular shape.

DETAILED DESCRIPTION

Figure 1:
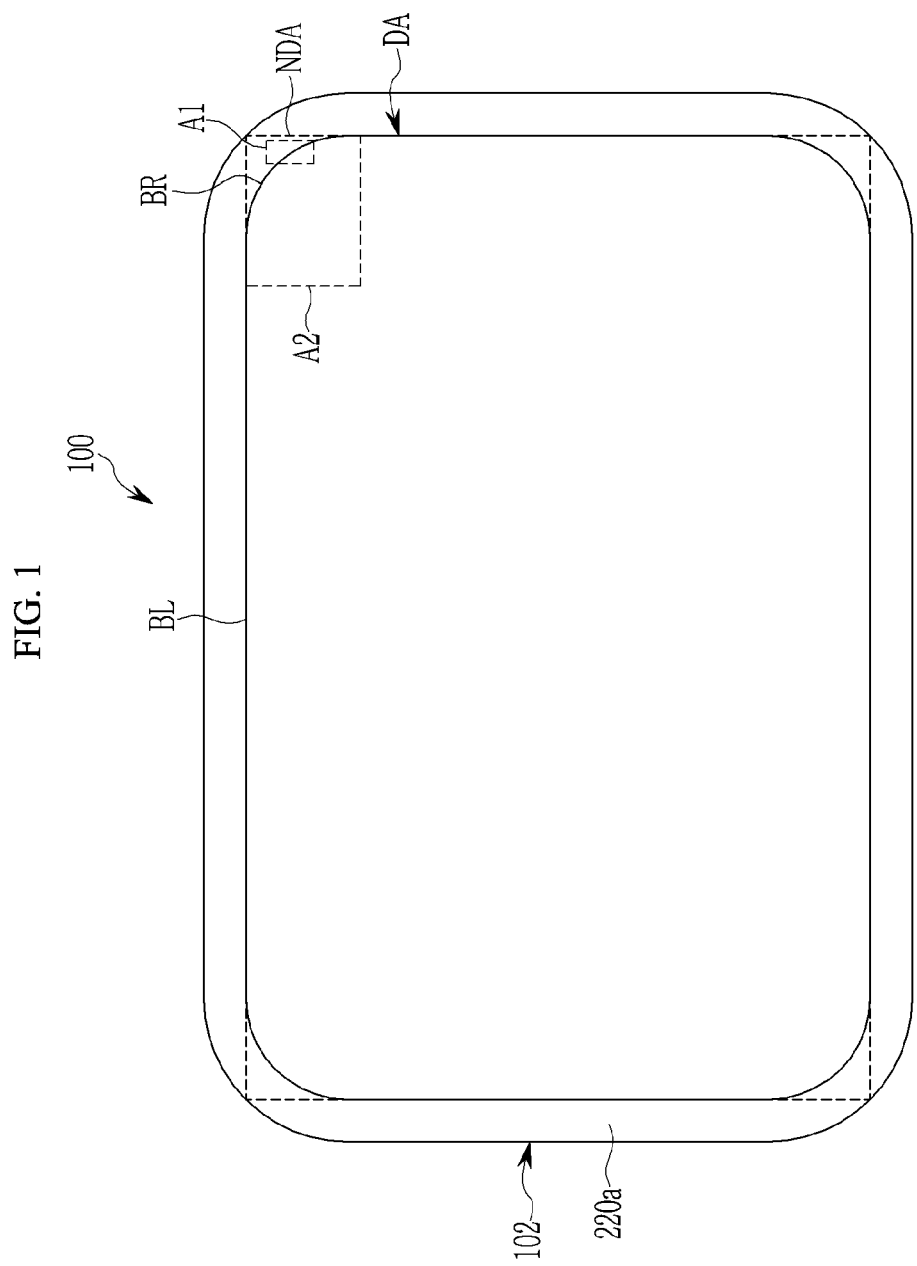
FIG. 1 is a top plan view schematically showing an exemplary embodiment of a display device or a display unit of a terminal according to the invention.

The invention will be described more fully hereinafter with reference to the accompanying drawings, in which exemplary embodiments are shown. As those skilled in the art would realize, the described exemplary embodiments may be modified in various different ways, all without departing from the spirit or scope of the invention.

In order to clarify the invention, parts that are not connected with the description will be omitted, and the same elements or equivalents are referred to by the same reference numerals throughout the specification.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. In addition, unless explicitly described to the contrary, the word "comprise" and variations such as "comprises" or "comprising" will be understood to imply the inclusion of stated elements but not the exclusion of any other elements.

FIG. 1 is a top plan view schematically showing an exemplary embodiment of a display unit 100 of a display device or a terminal according to the invention. As shown in the drawing, the display unit 100 includes a display area DA with an overall quasi-quadrangular shape. The display area DA includes a linear edge BL and at least one corner BR of non-right angular shape. The corner means a portion of the display area DA, where two non-parallel and straight line edges meet.

In an exemplary embodiment, the corner of the non-right angular shape may have a rounded shape, or a shape of connections of linear edges that interior angle between two adjacent edges is exceeding 90 degrees. Hereinafter, it is assumed that the corner of the non-right angular shape has the rounded shape.

The display unit 100 may include a first substrate 102 on which a plurality of pixels is positioned, and a light blocking member 220a positioned at a border of the first substrate 102. The first substrate 102 may have a shape corresponding to the shape of the display area DA. In an exemplary embodiment, for example, the first substrate 102 has four edges of the linear shape, and corners of a rounded shape each of which is positioned between adjacent two linear edges among the four edges.

The light blocking member 220a may be positioned at a border of the display area DA and cover a non-display area NDA where a pixel emitting light depending on a data signal is positioned such that the display area DA has the corner BR of the rounded shape. The light blocking member 220a is made of a light blocking material, thereby preventing light leakage from being generated therein.

In FIG. 1, it is described that the light blocking member 220a is positioned on a plurality of pixels which emit light to implement the border of the rounded shape. However, in alternative exemplary embodiment, the border of the rounded shape may be implemented by controlling the number of pixels, the size of each pixel, the shape of each pixel, etc. to be suitable for the border of the rounded shape. For example, for the display area DA to have the corner BR of the rounded shape, the pixel may not be positioned in the non-display area NDA.

Also, the display unit 100 may be a display panel having flexibility. Further, the display unit 100 may be a curved display panel of which a part is formed with a shape of a curved surface.

In addition, as shown in the drawing, by processing an outer corner of the display unit 100 with the rounded shape, an aesthetic sense may be provided to a user.

The pixels positioned at the corner area A1 of the rounded shape of the display unit 100 and the pixels adjacent thereto according to the invention will be described with reference to FIG. 2.

Figure 2:
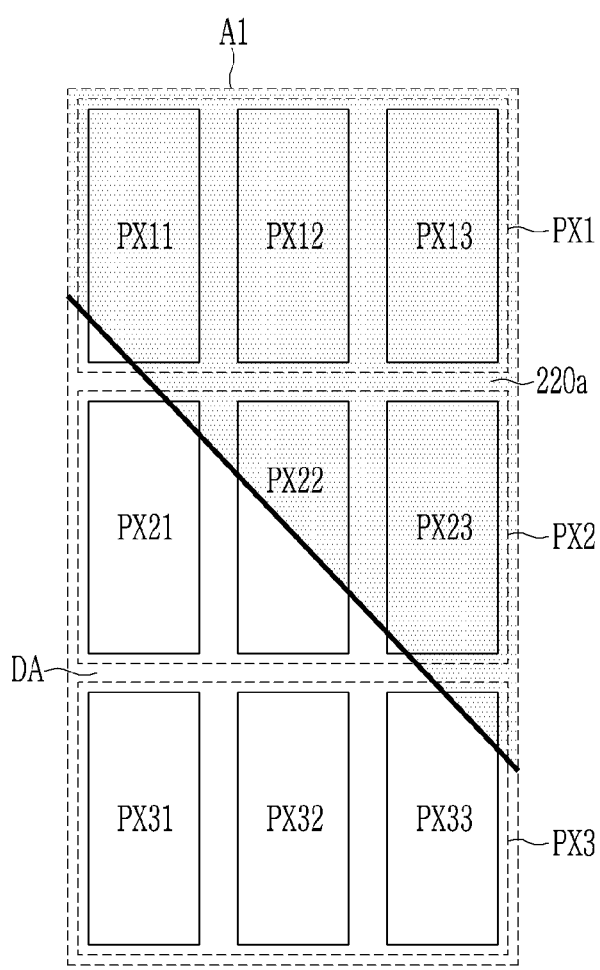
FIG. 2 is a top plan view showing an exemplary embodiment of several pixels of a display unit according to the invention.

FIG. 2 is a top plan view showing an exemplary embodiment of several pixels of a display unit 100 according to the invention. As shown in the drawing, first to third pixels PX1 to PX3 may be positioned on the first substrate 102. Each of the first to third pixels PX1 to PX3 may include a plurality of subpixels corresponding to primary colors that are different from each other. In this case, each size of the plurality of subpixels corresponding to the primary colors that are different from each other may be the same.

In an exemplary embodiment, for example, the first pixel PX1 includes three subpixels PX11, PX12, and PX13, the second pixel PX2 includes three subpixels PX21, PX22, and PX23, and the third pixel includes three subpixels PX31, PX32, and PX33. The three subpixels of each pixel may respectively represent red (R), green (G), and blue (B) colors.

However, an arrangement of the subpixels is not limited thereto and may be variously changed. Also, it is described that each pixel is made of a red subpixel, a green subpixel, and a blue subpixel, however the present invention is not limited thereto.

Some of the subpixels included in the pixels may be covered by the light blocking member 220a. For example, the subpixels PX11, PX12, and PX13 of the first pixel PX1, the subpixels PX22 and PX23 of the second pixel PX2, and the subpixel PX33 of the third pixel PX3 may be positioned on the border of the display area DA, thereby overlapping the light blocking member 220a.

Even if the data signal is supplied such that the pixel or the subpixels included in the pixel overlapping the light blocking member 220a emit light, the light may be blocked by the light blocking member 220a. Therefore, the image may not be displayed outside in the non-display area NDA where the pixels overlapping the light blocking member 220a are positioned.

In general, the image captured by a photographing apparatus such as a camera is displayed as various rectangular shapes depending on a length ratio of horizontal and vertical sides according to a standard of an image sensor capturing the image. Most images created by image production, image editing, etc. are also displayed as a rectangular shape. When displaying the image of the rectangular shape on the display unit 100 having the corners of the non-right angular shape, there is a problem that not all information of the image signal is displayed outside since the image information corresponding to the non-display area NDA of the display unit 100 is not displayed outside of the display device.

The display device, the terminal, and the controlling method thereof according to the invention may provide all information of the image signal to the user even if the image is not displayed on the non-display area.

Hereinafter, the display device 20 and the terminal 10 are described with reference to FIG. 3.

Figure 3:
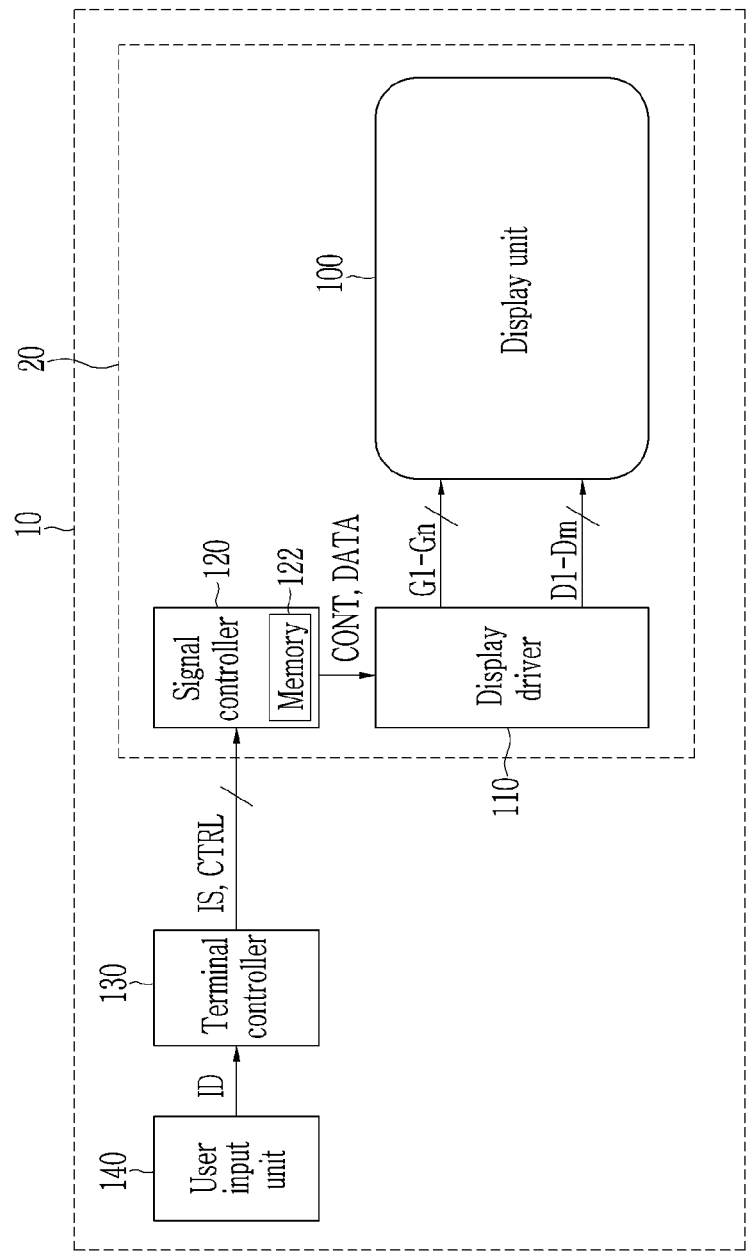
FIG. 3 is a block diagram showing an exemplary embodiment of a partial configuration of a display device and a terminal according to the invention.

FIG. 3 is a block diagram showing an exemplary embodiment of a partial configuration of a display device 20 and a terminal 10 according to the invention. As shown in the drawing, the display device 20 includes the display unit 100, a display driver 110, and a signal controller 120. The terminal 10 is connected to the display device 20, and includes a terminal controller 130 and a user input unit 140. The display device 20 may be operated as a part included in the terminal 10. Also, the display device 20 and the terminal 10 may be implemented as a separated device, and may be connected through an input and output interface. Hereinafter, it is assumed that display device 20 is implemented as a part included in the terminal 10. The display device 20 and the terminal 10 described in this application may have more or less constituent elements that are included in the above-described constituent elements.

In an exemplary embodiment, in the terminal 10 described in this application, a mobile phone, smart phone, a laptop computer, a digital broadcast terminal, a personal digital assistants ("PDA"), a portable multimedia player ("PMP"), a navigation device, a slate PC, a tablet PC, an Ultrabook, a wearable device (e.g., a smart watch, a smart glass, and a head mounted display ("HMD")), a digital TV, a desktop computer, digital signage, etc. may be included.

In an exemplary embodiment, the display unit 100 may be implemented in various types such as a plasma display panel ("PDP"), a liquid crystal display ("LCD"), an organic light emitting diode ("OLED") display, a flexible display, a 3D display, an e-ink display. Also, the display unit 100 may be realized as a touch screen, thereby performing a function of a user input unit 140. In the following, it is assumed that the display unit 100 is a liquid crystal display.

The display driver 110 receives image data DATA for the pixels of one row according to a control signal CONT, and selects gray level voltages corresponding to the image data DATA from all gray level voltages and then converts the image data DATA into data voltages D1 to Dm to be applied to the display unit 100. In addition, the display driver 110 applies gate signals G1-Gn made of a combination of a gate-on voltage and a gate-off voltage to the display unit 100 according to the control signal CONT.

The signal controller 120 controls an operation of the display driver 110. The signal controller 120 receives an image signal IS and a control signal CTRL that are input from the outside. The image signal IS includes luminance information of each pixel PX of the display unit 10, and luminance may be quantized into a predetermined number of gray levels, for example, 1024, 256, or 64. The input control signal CTRL may include a vertical synchronization signal and a horizontal synchronization signal, a main clock signal, a data enable signal, and the like in association with displaying the image on the display device 20.

The signal controller 120 may appropriately process the image signal IS to be suitable for the operating conditions of the display unit 100 based on the image signal IS and the input control signal CTRL and then generate the image data DATA, and may generate the control signal CONT based on the input control signal CTRL.

The signal controller 120 may perform edge detection for the input image signal IS. For example, the signal controller 120 may detect a boundary of an object in the image based on a brightness difference in the image signal of one frame.

Also, the signal controller 120 may execute specific pattern detection for the edge-detected image signal. In an exemplary embodiment, for example, the signal controller 120 may determine whether the pattern detected in the image signal of one frame is similar to one of patterns pre-stored in a memory 122.

In another exemplary embodiment, the signal controller 120 may determine a pattern that moves more than a predetermined distance (e.g., a distance that is predetermined by a pixel unit or by a length unit) within two continuous image frames as the specific pattern. In this case, the signal controller 120 may store the detected specific pattern to the memory 122.

If the specific pattern is detected, the signal controller 120 may determine the position of the specific pattern within the image and the change of the position. Also, the signal controller 120 generates and outputs the image data DATA according to the determined result such that the image including the partial image is displayed on the display unit 100.

The memory 122 stores information for at least one specific pattern.

The user input unit 140 of the terminal 10 is to receive information from the user, and if the input signal ID is input through the user input unit 140, the terminal controller 130 of the terminal 10 may control the operation of the terminal 10 to correspond to the input information. The user input unit 140 may include a remote control device, a mouse, a keyboard, etc. In an exemplary embodiment, for example, the remote control device may transmit the input signal ID to the terminal 10 through a Bluetooth, RF communication, infrared communication, Ultra-Wideband ("UWB"), or ZigBee method. The remote control device can be implemented as a space remote control device. The space remote control device may sense the operation of a main body thereof in space to generate the input signal.

The terminal controller 130 of the terminal 10 may control the entire operation of the terminal 10. In an exemplary embodiment, for example, the terminal controller 130 may recognize a region of the display unit 100 the user indicates according to the input signal ID input from the user input unit 140. The terminal controller 130 may generate an object (e.g., an image having a mouse pointer shape such as an arrow) corresponding to the position indicated by the user. Also, the terminal controller 130 generates the image signal IS and the control signal CTRL such that the generated object is displayed at the corresponding position of the image.

At least some of the elements may be operated in cooperation with each other to implement the operations, the controls, or the control method of the display device 20 and the terminal 10 according to various exemplary embodiments described below.

Hereinafter, exemplary embodiments related to the controlling method implemented in the display device 20 and the terminal 10 as above-configured will be described with reference to FIG. 4 and FIG. 5.

Figure 4:
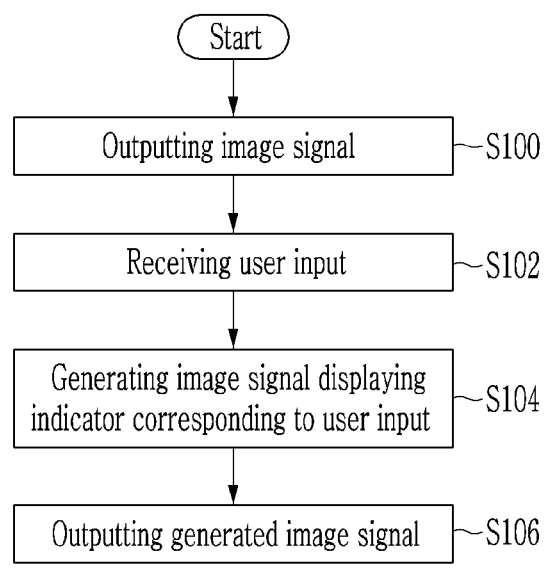
FIG. 4 and FIG. 5 are flowcharts to explain a controlling method of a display device and a terminal according to an exemplary embodiment.
Figure 5:
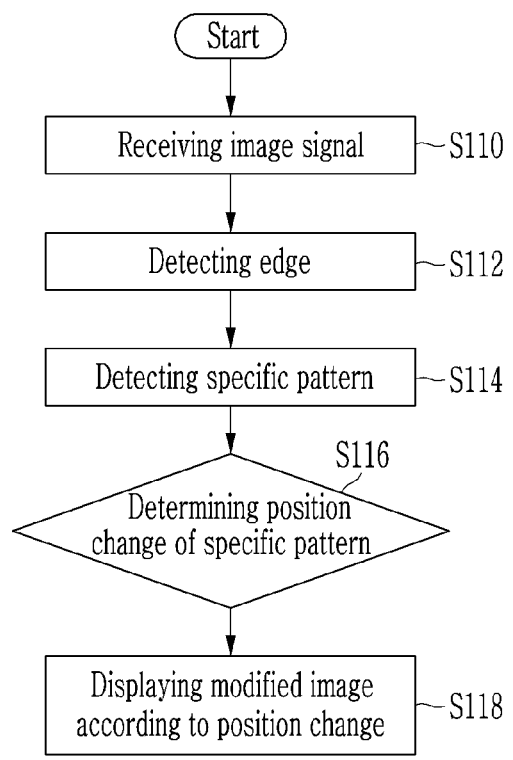

FIG. 4 and FIG. 5 are flowcharts to explain an exemplary embodiment of a controlling method of a display device 20 and a terminal 10 according to the invention. As shown in FIG. 4, the terminal controller 130 outputs the image signal IS to the signal controller 120 (S100). Thus, the image may be displayed on the display unit 100 by the image signal IS input to the signal controller 120.

Next, the terminal controller 130 receives the user input that is input through the user input unit 140 (S102). The user may designate one position of the display unit 100 on which the image is displayed through the user input unit 140, that is, the mouse, the remote control device, etc. The terminal controller 130 may receive designation information for the one position designated through the user input unit 140. Also, the user may execute an operation such as a click or a double click through the user input unit 140. The terminal controller 130 may receive control information corresponding to the input of the click, the double click, etc. from the user input unit 140.

The terminal controller 130 generates the image signal IS for displaying an indicator corresponding to the user input (S104) and output the image signal IS to the signal controller 120 (S106). The terminal controller 130 may generate the image signal IS to further display the indicator in the original image. In this case, the shape of the indicator may be diverse according to an application program, etc. that is executed in the terminal controller 130. In an exemplary embodiment, the partial image signal displaying the indicator may be the image signal having a different gray level compared to other region. In another exemplary embodiment, the partial image displaying the indicator may be one synthesized image of the indicator and the original image.

Thus, as shown in FIG. 5, the signal controller 120 receives the image signal IS (S110). The image signal IS as a signal output from the terminal controller 130 may satisfy a predetermined interface standard.

Next, the signal controller 120 executes the edge detection for the image signal IS (S112). The signal controller 120 may detect the edge in the entire image of one frame displayed by the image signal IS, or may detect the edge only for a part corresponding to the partial area A2 (referring to FIG. 1) of the display unit 100 among the image signal IS. In an exemplary embodiment, the signal controller 120 may filter the image signal IS before the edge detection using a directional filter such as a Gabor filter to clearly distinguish the edge.

The signal controller 120 detects the specific pattern in the edge-detected image signal IS (S114). The signal controller 120 may detect the specific pattern in the entire image of one frame or may detect the specific pattern only in a specific part of the image of one frame.

The signal controller 120 may detect the specific pattern that is similar to the pre-stored pattern in the image of one frame with reference to the patterns pre-stored in the memory 122. Also, the signal controller 120 may detect the specific pattern that moves more than a predetermined distance in the image of the continuous frames.

The signal controller 120 determines the position change of the specific pattern (S116). The signal controller 120 also displays the image using the presence or absence of the position change, the changed position, etc. (S118). The step S116 of determining the position change will be described later with reference to FIG. 8 to FIG. 10, and the step S118 of displaying a modified image according to the position change will be described later with reference to FIG. 11 to FIG. 15.

Hereinafter, the image displaying on the partial area A2 of the display unit 100 after the input of the user will be described with reference to FIG. 6.

Figure 6:
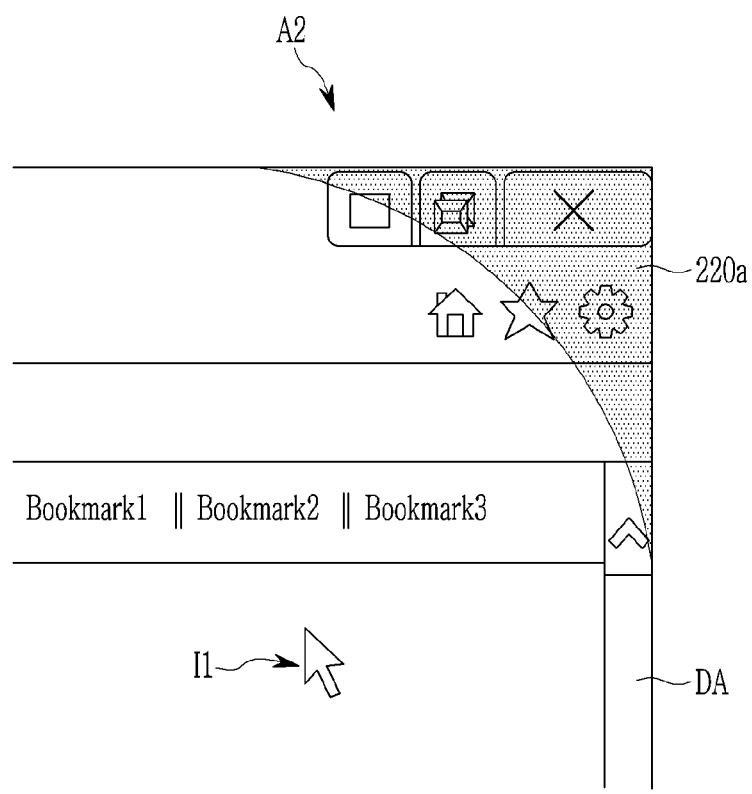
FIG. 6 is a schematic view showing an exemplary embodiment of an operation that an image is displayed on a partial region of a display unit of a display device or a terminal.

FIG. 6 is a schematic view representing an exemplary embodiment of an operation that an image is displayed on a partial area A2 of a display unit 100 of a display device 20 or a terminal 10. As shown, the image may be displayed to be suitable for the display area DA. However, a part of the image displayed on the partial area A2 of the display unit 100 is blocked by the light blocking member 220a such that it is not recognized to the user.

In addition, the indicator I1 (e.g., an arrow shape) of the user input that is input through the user input unit 140 may be displayed in the image. The user may recognize the indicator I1 in the image displayed on the display unit 100 and may move the indicator I1 using the user input unit 140. Also, the user may make the display unit 100 to display desired information on the display unit 100 through an operation such as the clicking, to reduce the displayed information, or to end the information display.

Figure 7:
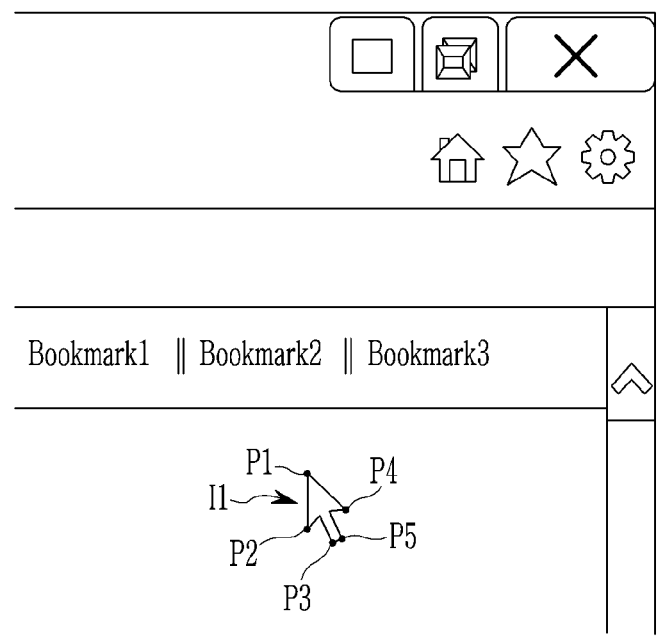
FIG. 7 is a schematic view showing an exemplary embodiment of a part of an edge-detected image according to the invention.

When the image signal IS is input from the terminal controller 130, the signal controller 120 may execute the edge detection for the image signal IS as shown in FIG. 7.

FIG. 7 is a schematic view showing an exemplary embodiment of a part of an edge-detected image according to the invention. The signal controller 120 may detect the edge of the entire image of one frame, or may detect the edge only for the part corresponding to the partial area A2 of the display unit 100 among the image signal IS. The signal controller 120 may detect the specific pattern in the part of the image of one frame.

In an exemplary embodiment, for example, the signal controller 120 refers to the pattern stored in the memory 122. The pattern stored in the memory 122 may include a plurality of feature points or feature lines. The signal controller 120 may search the feature points P1, P2, P3, P4, and P5 in the image, having similar arrangements to the feature points of the stored pattern in the memory 122. The positional relationship of the feature points of the specific pattern in the image may have a reduced or enlarged scale of a predetermined ratio with respect to the positional relationship of the feature points of the stored pattern in the memory 122.

FIG. 7 shows the pattern of a general mouse cursor shape. However, an indicator I1 may be displayed with various patterns in the image, and the information for these patterns may be stored in the memory 122.

In another exemplary embodiment, if the same image pattern moves a predetermined distance measured by a pixel unit between the continuous frames, the signal controller 120 may detect this movement as the specific pattern.

Hereinafter, the position change of the detected pattern will be described with reference to FIG. 8 to FIG. 10.

Figure 8:
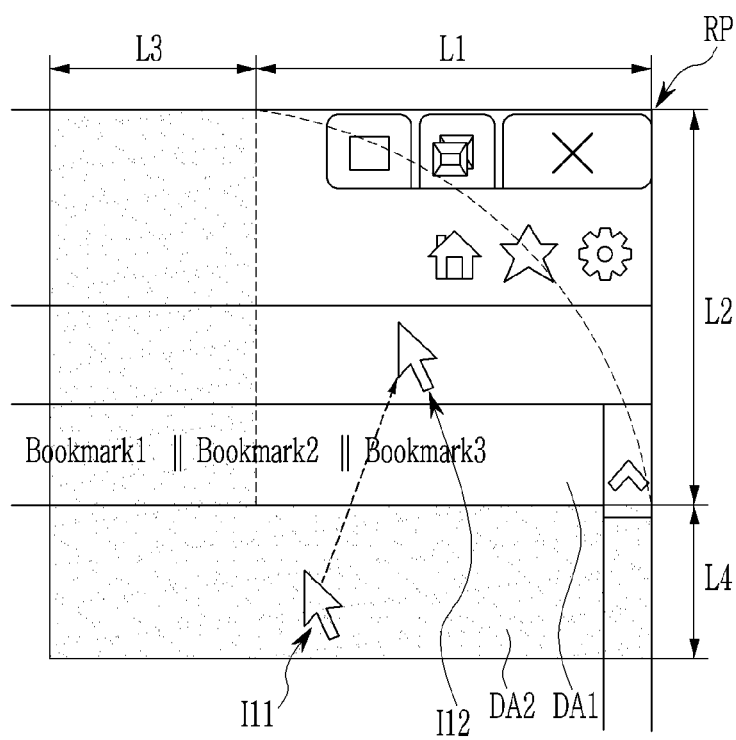
FIG. 8 to FIG. 10 are schematic views showing an exemplary embodiment of an operation detecting a user input of a display device or a terminal according to the invention.
Figure 9:
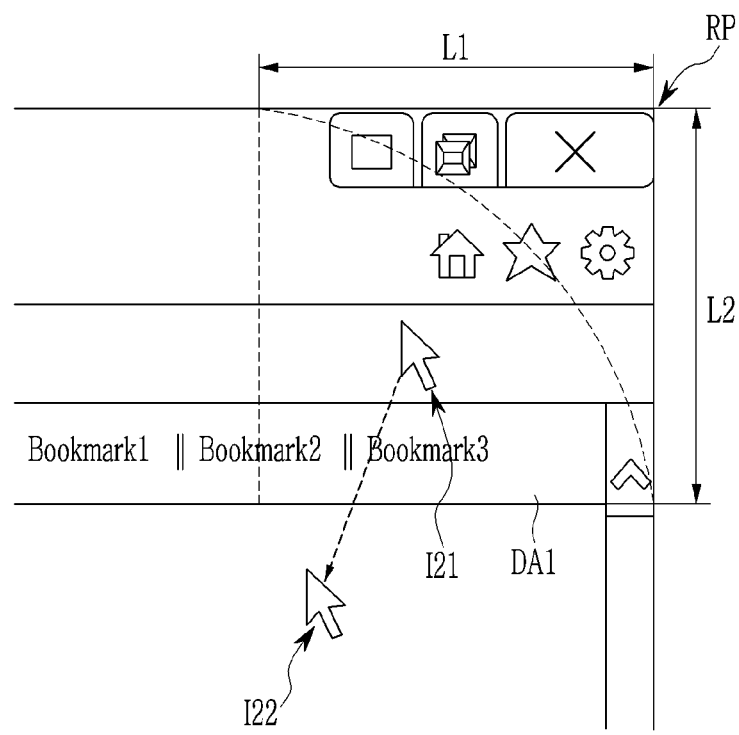
Figure 10:
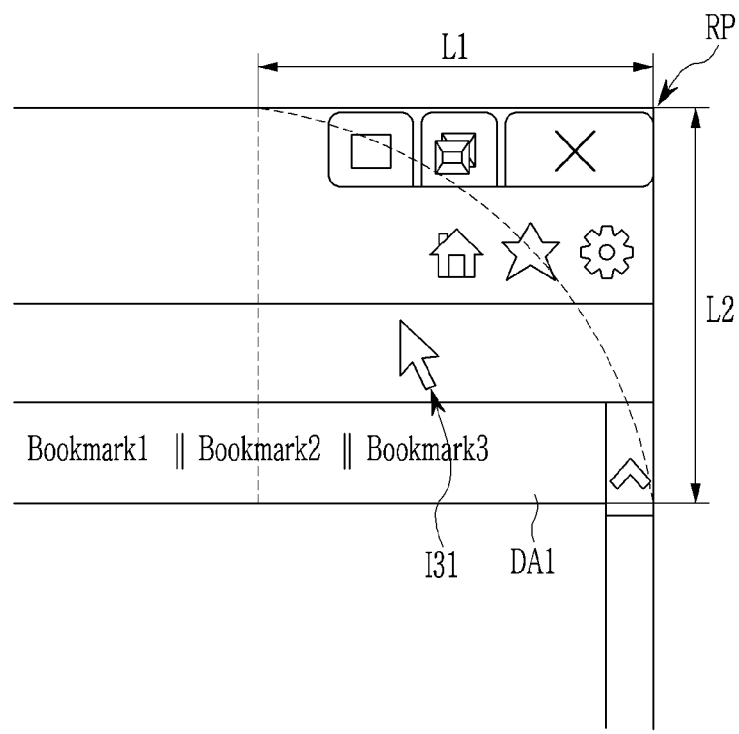

FIG. 8 to FIG. 10 are schematic views showing an exemplary embodiment of an operation detecting a user input of a display device 20 or a terminal 10 according to the invention. The signal controller 120 may detect the edge of the input image signal IS by a unit of one frame, and may recognize the specific pattern through the detected edge.

As shown in FIG. 8, the signal controller 120 may determine that a first position change occurs if a specific pattern (e.g., an arrow shape) moves from a second region DA2 in the image of a first frame to a first region DA1 in the image of a second frame following the first frame.

In an exemplary embodiment, for example, the first region DA1 is a region in the image including the non-display area NDA, and a part of the first region DA1 which is in the non-display area NDA is not displayed outside on the display unit 100 or is not recognized to the user. It is assumed that the first region DA1 is a region of a rectangular shape having a length L1 in a horizontal direction and a length L2 in a vertical direction from a virtual reference point RP. In this case, the lengths L1 and L2 may be similar to a horizontal maximum length and a vertical maximum length, respectively, of the region that is not displayed by the non-display area NDA when the image signal IS is displayed on the display unit 100. It is assumed that the second region DA2 is an "L" shape region around the first region DA1 and a region extending by a length L3 in the horizontal direction and a length L4 in the vertical direction from positions where the first region DA1 ends. In addition, the specific pattern I11 corresponds to the specific pattern in the second region DA2 and the specific pattern I12 corresponds to the specific pattern in the first region DA1 which moved from the second region DA2.

The shapes of the first region DA1 and the second region DA2 are not limited to the shape shown in FIG. 8. In another exemplary embodiment, the shapes of the first region DA1 and the second region DA2 may be a fan shape, a triangle shape, or a polygon shape. Coordinate information of the non-display area NDA may be stored in the memory 122, and the signal controller 120 may set the first region DA1 and the second region DA2 in the image using the coordinate information of the non-display area NDA.

As shown in FIG. 9, the signal controller 120 may determine that a second position change occurs if the specific pattern moves from the first region DA1 to outside of the first region DA1 in the image. In an exemplary embodiment, the specific pattern 121 corresponds to the specific pattern in the first region DA1 before moving out and the specific pattern 122 corresponds to the specific pattern after moving out of the first region DA1.

Also, as shown in FIG. 10, the signal controller 120 may determine a state that the specific pattern I31 is positioned in the first region DA1 if the specific pattern I31 is positioned at the first region DA1 in the image during a predetermined period.

Hereinafter, the partial image displayed on the display unit 100 in relation to the position change state of the specific pattern determined by the signal controller 120 will be described with reference to FIG. 11 to FIG. 15.

FIG. 11 to FIG. 15 are schematic views showing exemplary embodiments of operations of further displaying a partial image on a display unit 100 of a display device 20 or a terminal 10 according to the invention.

Figure 11:
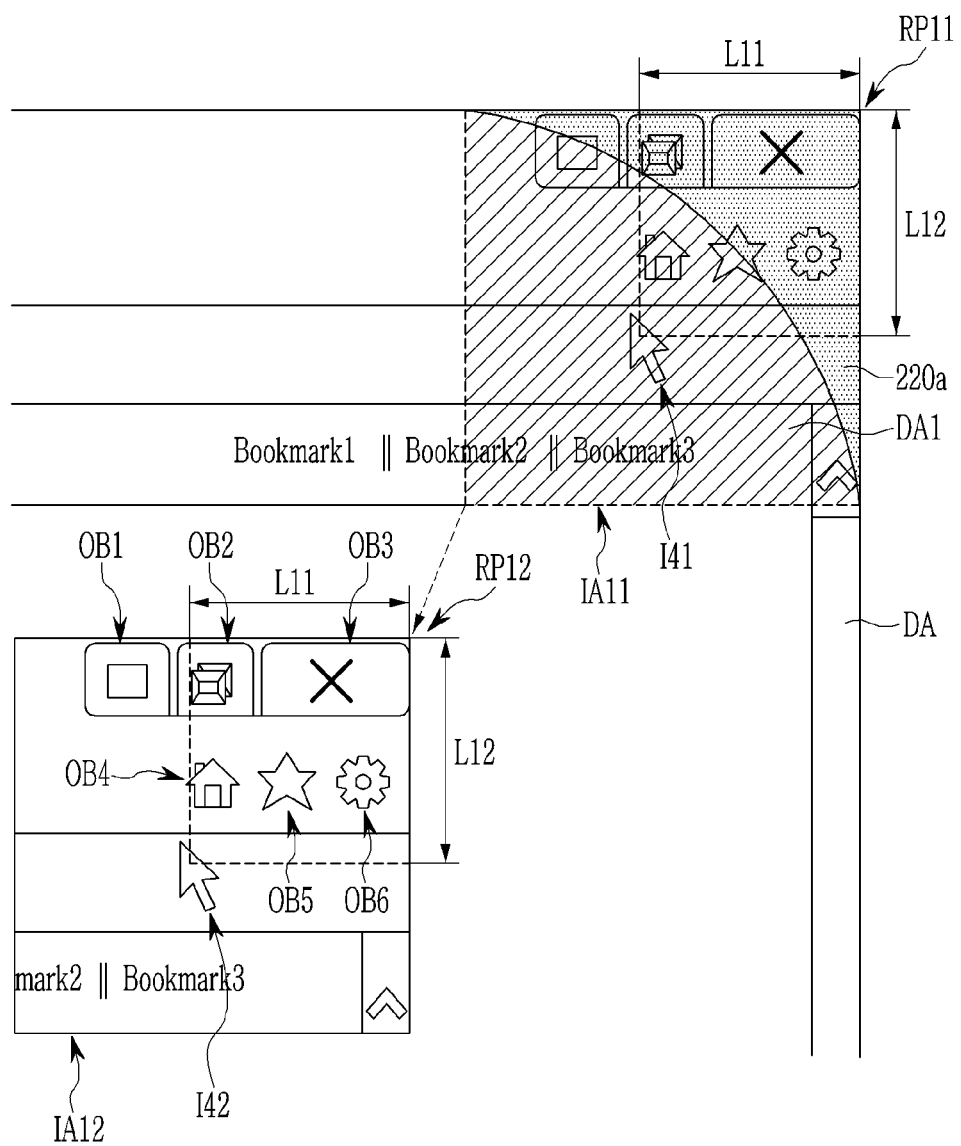
FIG. 11 to FIG. 15 are schematic views showing exemplary embodiments of operations of further displaying a partial image on a display unit of a display device or a terminal according to the invention.

As shown in FIG. 11, the signal controller 120 moves the partial image IA12 of the same size as the image IA11 corresponding to the first region DA1, from the first region DA1 in the diagonal direction to be displayed in the display area DA.

In this case, the indicator 141 in the image IA11 and the indicator 142 in the partial image IA12 may be displayed together. Also, the relative position of the indicator 141 in the image IA11 and the relative position of the indicator 142 in the partial image IA12 may be the same. For example, the indicator 141 in the image IA11 may be positioned away from the virtual reference position RP11 of the image IA11 by the length L11 in the horizontal direction and the length L12 in the vertical direction, and the indicator 142 in the image IA12 may be positioned away from the virtual reference position RP12 of the image IA12 by the length L11 in the horizontal direction and the length L12 in the vertical direction.

Some objects of the image IA11 that are not displayed outside since the light blocking member 220a covers them may be displayed as the objects OB1-OB6 in the partial image IA12.

The user may move the indicator 142 in the partial image IA12 displayed on the display unit 100 using the user input unit 140, and may select at least one object among the objects OB1-OB6 using the indicator 142.

When the specific pattern detected in the image signal IS input to the signal controller 120 is outside the region where the partial image IA12 is displayed, the signal controller 120 may stop the display of the partial image IA12.

Figure 12:
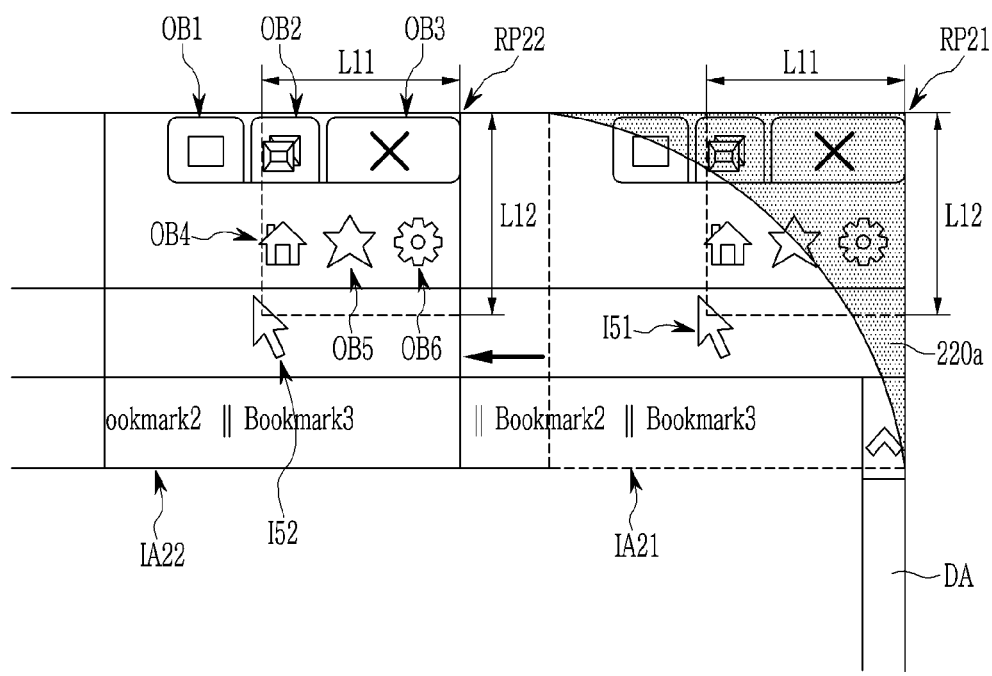
Figure 13:
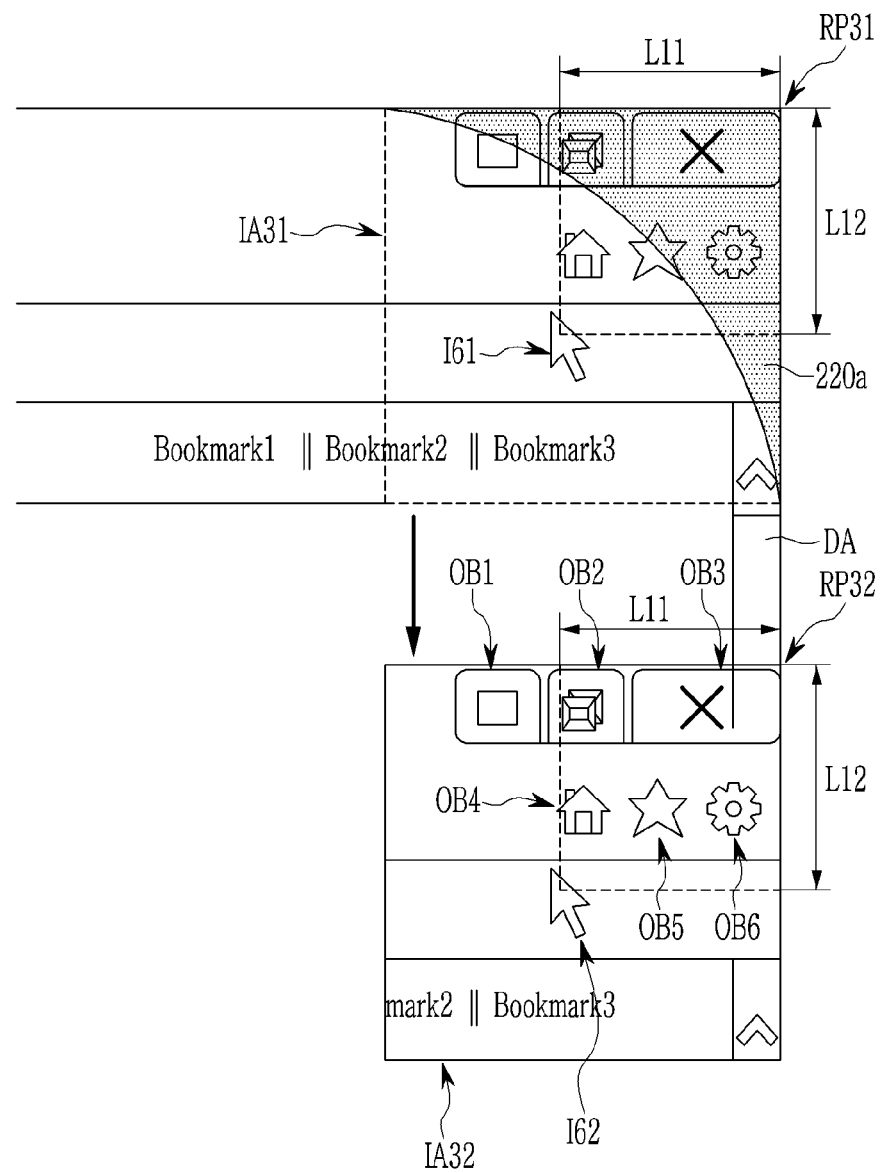

As shown in FIG. 12, the signal controller 120 may move the partial image IA22 of the same size as the image IA21 corresponding to the first region DA1, in the horizontal direction from the first region DA1 to be displayed in the display area DA. Also, as shown in FIG. 13, the signal controller 120 may move the partial image IA32 of the same size as the image IA31 corresponding to the first region DA1, in the vertical direction from the first region DA1 to be displayed in the display area DA.

In the case of FIG. 12 and FIG. 1, the user may also move the indicators 152 and 162 in the partial images IA22 and IA32 displayed on the display unit 100 using the user input unit 140, and may also select at least one object among the objects OB1-OB6 using the corresponding indicator.

Also, the relative position of the indicator 151 in the image IA21 may be the same as the relative position of the indicator 152 in the partial image IA22. For example, the indicator 151 in the image IA21 may be positioned away from the virtual reference position RP21 of the image IA21 by the length L11 in the horizontal direction and the length L12 in the vertical direction, and the indicator 152 in the image IA22 may be positioned away from the virtual reference position RP22 in the image IA22 by the length L11 in the horizontal direction and the length L12 in the vertical direction.

The relative position of the indicator 161 in the image IA31 and the relative position of the indicator 162 in the partial image IA32 may be the same. For example, the indicator 161 in the image IA31 may be positioned away from the virtual reference position RP31 of the image IA31 by the length L11 in the horizontal direction and the length L12 in the vertical direction, and the indicator 162 in the image IA32 may be positioned away from the virtual reference position RP32 of the image IA32 by the length L11 in the horizontal direction and the length L12 in the vertical direction.

Figure 14:
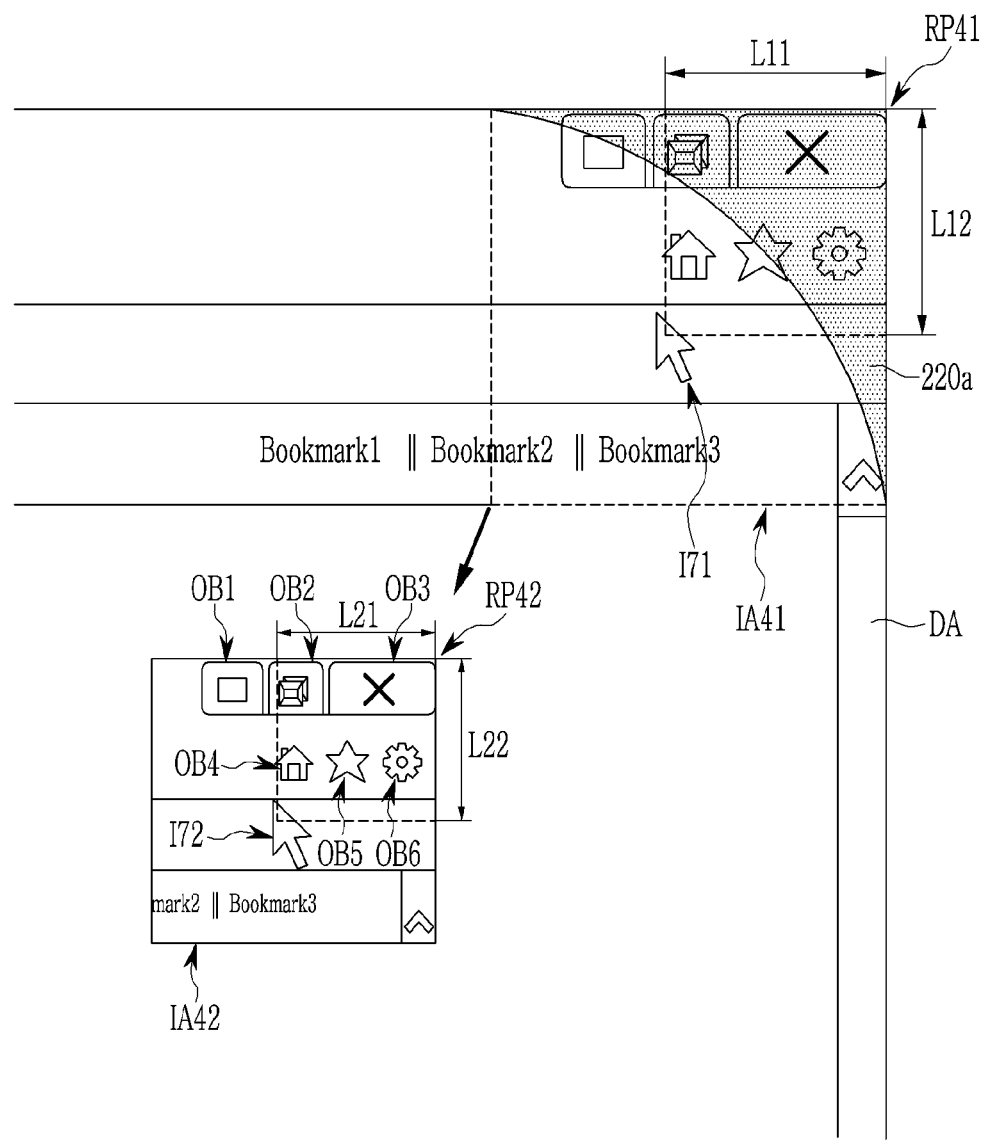

Also, as shown in FIG. 14, the signal controller 120 may move the partial image IA42 of the size that the image IA41 corresponding to the first region DA1 is reduced in a predetermined ratio, in the diagonal direction from the first region DA1 to be displayed in the display area DA.

The indicator 171 in the image IA41 may be positioned away from the virtual reference position RP41 of the image IA41 by the length L11 in the horizontal direction and the length L12 in the vertical direction, and the indicator 172 in the image IA42 may be positioned away from the virtual reference position RP42 of the image IA42 by the length L21 in the horizontal direction and the length L22 in the vertical direction. In this case, there may be a relation of L11:L21=L12:L22 between the above lengths. However, the sizes of the displayed indicators 171 and 172 may be the same.

FIG. 14 shows an example in which the partial image IA42 is displayed in the reduced size of the partial image IA41. However, in another exemplary embodiment, the partial image IA42 may be displayed in the enlarged size of the partial image IA41 by a predetermined ratio.

Figure 15:
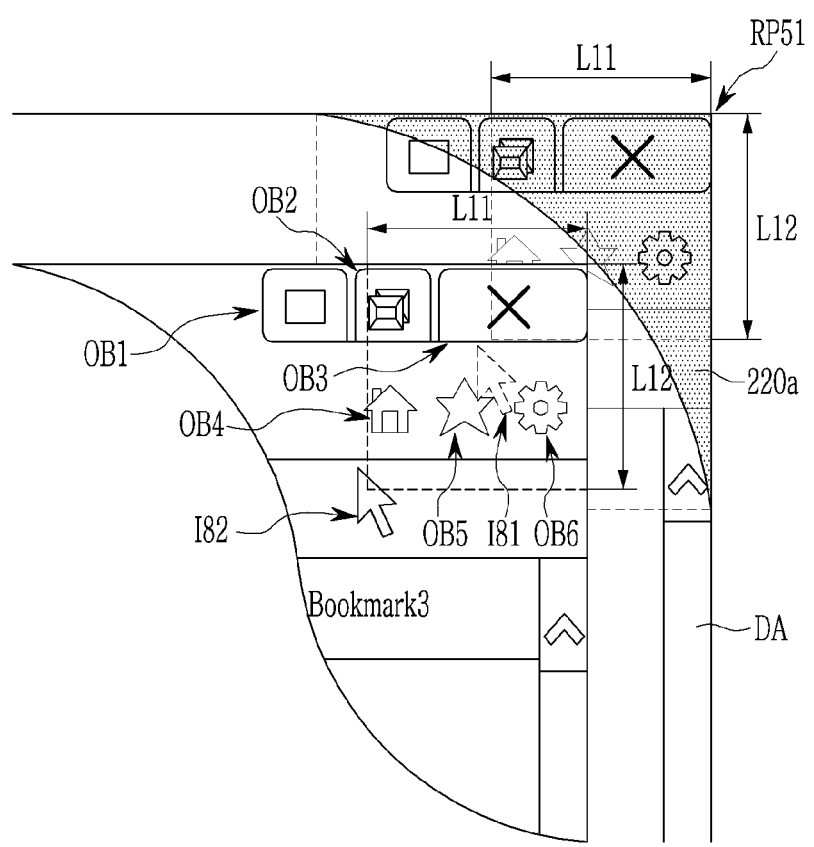

Further, as shown in FIG. 15, the signal controller 120 may move the partial image including the image blocked by the light blocking member 220a in the first region DA1, from the first region DA1 in the diagonal direction to be displayed in the display area DA. To minimize the region covered by the partial image, the edge of the partial image may have a wave shape like in FIG. 15 rather than the partial image has a rectangular shape.

In this case, the relative position of the indicator 181 in the image blocked by the light blocking member 220a in the first region DA1 and the relative position of the indicator 182 in the partial image may be the same. The indicator 181 in the image blocked by the light blocking member 220a in the first region DA1 may be covered by the partial image.

Again referring to FIG. 5, and as shown in FIG. 8 to FIG. 10, the signal controller 120 may determine the position change of the specific pattern by the first position change, the second position change, and the state that the specific pattern is positioned in the first region DA1 during a predetermined period.

In the case that the signal controller 120 determined as the first position change, the signal controller 120 may further display the partial image as shown in FIG. 11 to FIG. 15.

In the case that the signal controller 120 determined as the second position change, the signal controller 120 may stop the display of the partial image. Also, while displaying the partial image, the signal controller 120 may stop the display of the partial image in the case that the signal controller 120 determined as the state that the specific pattern is positioned in the first region DA1 during a predetermined period.

According to the exemplary embodiments of the display device 20, the terminal 10, and the controlling method thereof, the image may be displayed on the display unit 100 without a loss of the information to be displayed. Also, because the partial image is displayed by using the image signal IS input to the display unit 100 of the display device 20 or the terminal 10, there is an effect of reducing latency.

While this invention has been described in connection with what is considered to be practical exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A display device comprising:
a display unit which includes a plurality of pixels and a display area having a corner of a non-right angular shape; and
a signal controller which controls the display unit to display an image through the plurality of pixels based on an input image signal, detects a first specific pattern in a partial region, of the image, corresponding to a partial area, of the display unit, including the corner of the non-right angular shape, and controls the display unit to display a partial image corresponding to the partial region of the image in the display area without crossing the corner, according to a position of the first specific pattern in the partial region,
wherein the signal controller searches the first specific pattern only in the partial region of the image,
wherein the signal controller executes edge detection for the image signal, and detects the first specific pattern using the edge-detected image signal, and
wherein if a first pattern moves a predetermined distance measured by a pixel unit between two continuous frames of the image signal, the signal controller detects the first pattern as the first specific pattern.

2. The display device of claim 1, wherein
the display unit further includes:
a substrate including a corner of a non-right angular shape; and
a light blocking member positioned at a boundary of the display area and which overlaps at least one subpixel among subpixels included in a pixel, of the plurality of pixels, positioned at the corner of the non-right angular shape of the display area.

3. The display device of claim 1, wherein
the signal controller classifies a region, of the image, corresponding to the partial area including the corner of the non-right angular shape as a first region and another region, of the image, around the first region as a second region to determine the position of the first specific pattern.

4. The display device of claim 3, wherein
the signal controller controls the display unit to display the partial image corresponding to the partial region of the image in the display area, if the first specific pattern is detected in the second region of a first frame of the image signal and the first specific pattern is detected in the first region of a second frame following the first frame.

5. The display device of claim 4, wherein
the signal controller controls the display unit to stop the display of the partial image if the first specific pattern is detected in the first region of a third frame of the image signal and the first specific pattern is detected outside the first region of a fourth frame following the third frame.

6. The display device of claim 4, wherein
the signal controller controls the display unit to stop the display of the partial image if the first specific pattern is detected in the first region during a predetermined time after the partial image is displayed.

7. The display device of claim 4, wherein
the signal controller reduces the partial region of the image in a predetermined ratio to make the partial image.

8. The display device of claim 4, wherein
the signal controller controls the display unit to display a second specific pattern, in the partial image, corresponding to the first specific pattern of the partial region at a position corresponding to a position of the first specific pattern in the partial region.

9. A terminal comprising:
a display unit which includes a plurality of pixels;
a user input unit which receives an input of a user indicating one region of the display unit;
a terminal controller which generates an image signal displaying an indicator corresponding to the user input; and
a signal controller which controls the display unit to display an image through the plurality of pixels based on the generated image signal, detects a pattern corresponding to the indicator in the image, and moves a partial image corresponding to a partial region of the image corresponding to the one region based on a position of the pattern in the one region,
wherein the signal controller searches the pattern only in the partial region of the image,
wherein the signal controller executes edge detection for the image signal, and detects the pattern using the edge-detected image signal, and
wherein if a first pattern moves a predetermined distance measured by a pixel unit between two continuous frames of the image signal, the signal controller detects the first pattern as the pattern.

10. The terminal of claim 9, wherein
the display unit further includes:
a substrate which includes a corner of a non-right angular shape, wherein the plurality of pixels is disposed on the substrate; and
a light blocking member which overlaps at least one subpixel among subpixels included in a pixel, of the plurality of pixels, positioned at the corner of the non-right angular shape.

11. The terminal of claim 10, wherein
the one region includes the pixel positioned at the corner of the non-right angular shape.

12. The terminal of claim 9, wherein
a shape of the indicator varies depending on an executed application program.

13. A method for controlling a display device displaying an image on a display unit including a plurality of pixels and a display area having a corner of a non-right angular shape, comprising:
receiving an image signal;
executing edge detection for the image signal;
detecting a specific pattern in a partial region, of the image, corresponding to a partial area, of the display unit, including the corner of the non-right angular shape based on the edge-detected image signal; and
displaying a partial image corresponding to the partial region of the image in the display area without crossing the corner, based on a position of the specific pattern in the partial region,
wherein detecting the specific pattern in the partial region includes searching the specific pattern only in the partial region of the image,
wherein the signal controller executes edge detection for the image signal, and detects the first specific pattern using the edge-detected image signal, and
wherein if a first pattern moves a predetermined distance measured by a pixel unit between two continuous frames of the image signal, the signal controller detects the first pattern as the first specific pattern.

14. The method of claim 13, wherein
displaying the partial image in the display area includes:
classifying a region, of the image, corresponding to the partial area including the corner of the non-right angular shape as a first region and another region, of the image, around the first region as a second region; and
displaying the partial image corresponding to the partial region of the image in the display area, if the specific pattern is detected in the second region of a first frame of the image signal and the specific pattern is detected in the first region of a second frame following the first frame.

15. The method of claim 14, further comprising
stopping the display of the partial image if the specific pattern is detected in the first region of a third frame of the image signal and the specific pattern is detected outside the first region of a fourth frame following the third frame.

16. The method of claim 14, further comprising
stopping the display of the partial image if the specific pattern is detected in the first region during a predetermined time after the partial image is displayed.

* * * * *